United States Patent
Chen et al.

(10) Patent No.: US 7,882,413 B2
(45) Date of Patent: Feb. 1, 2011

(54) METHOD AND/OR SYSTEM FOR SPACE-TIME ENCODING AND/OR DECODING

(75) Inventors: Hangjun Chen, Tyngsborough, MA (US); Alexander M. Haimovich, North Brunswick, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1278 days.

(21) Appl. No.: 11/335,957

(22) Filed: Jan. 19, 2006

(65) Prior Publication Data

US 2006/0233281 A1    Oct. 19, 2006

Related U.S. Application Data

(60) Provisional application No. 60/645,527, filed on Jan. 20, 2005.

(51) Int. Cl.
*H03M 13/00* (2006.01)
(52) U.S. Cl. .................. 714/751; 714/753; 714/791
(58) Field of Classification Search .......... 714/751, 714/753, 754, 774, 795, 791, 793, 752, 792
See application file for complete search history.

(56) References Cited

U.S. PATENT DOCUMENTS

| | | | |
|---|---|---|---|
| 6,678,263 B1* | 1/2004 | Hammons et al. | 370/342 |
| 6,801,579 B1* | 10/2004 | Hassibi et al. | 375/264 |
| 6,862,434 B2* | 3/2005 | Wallace et al. | 455/101 |
| 6,889,355 B1* | 5/2005 | Calderbank et al. | 714/792 |
| 7,158,579 B2* | 1/2007 | Hottinen | 375/267 |
| 7,190,734 B2* | 3/2007 | Giannakis et al. | 375/267 |
| 7,236,536 B2* | 6/2007 | Hochwald et al. | 375/265 |
| 7,327,983 B2* | 2/2008 | Mehta et al. | 455/63.1 |
| 7,389,464 B2* | 6/2008 | Jeong et al. | 714/752 |
| 7,486,739 B2* | 2/2009 | Hottinen et al. | 375/267 |
| 7,623,590 B2* | 11/2009 | Hottinen | 375/267 |
| 2004/0121809 A1* | 6/2004 | Wallace et al. | 455/562.1 |
| 2004/0139378 A1* | 7/2004 | Akhter et al. | 714/755 |

* cited by examiner

*Primary Examiner*—Fritz Alphonse
(74) *Attorney, Agent, or Firm*—Connolly Bove Lodge & Hutz LLP (57) ABSTRACT

Time-space encoding and/or decoding may employ time variant linear transformations. Turbo coding and/or decoding may be used in conjunction with the use of time variant linear transformations. Such time variant linear transformations may be unitary in nature.

22 Claims, 5 Drawing Sheets

METHOD AND/OR SYSTEM FOR SPACE-TIME ENCODING AND/OR DECODING

RELATED APPLICATION

The current application claims priority to U.S. Provisional Application No. 60/645,527, filed on Jan. 20, 2005, titled "Turbo Space-Time Codes with Time Varying Linear Transformations."

GOVERNMENT LICENSE RIGHTS

The U.S. Government has a paid-up license in this invention and the right in limited circumstances to require the patent owner to license others on reasonable terms as provided for by the terms of contract No. F49620-03-1-0161 awarded by the Air Force Research Laboratory Grants.

FIELD

This disclosure relates to communications.

BACKGROUND

Space-time codes have been employed for transmitting information in multiple input multiple output (MIMO) wireless communication channels. It is desirable that such space-time codes achieve full diversity gain.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

An "information stream" as referred to herein relates to information that is provided from a source to a destination over time. "Encoding" has referred to herein relates to a transformation of information in a first form to information in a second form. In one embodiment, such information which is encoded to a second form maybe completely recoverable using a "decoding" technique. However, this is merely an example of how encoded may be completely recoverable and claimed subject matter is not limited in this respect.

In one particular embodiment, although claimed subject matter is not limited in this respect, information may be encoded into code "blocks" of a predetermined size using a block encoding process. Here, such code blocks may contain symbols representing encoded information from an information stream for transmission in a communication channel. Such code blocks may comprise, for example, one or more symbols as codewords representing information to be transmitted the communication channel. Received blocks may be block decoded to extract the transmitted information.

According to an embodiment, although claimed subject matter is not limited in this respect, block encoding may be employed in a process referred to herein as "turbo encoding" in which error correction codes are included in and/or appended to code blocks for transmission in a communication channel. In a particular embodiment of turbo encoding, although claimed subject matter is not limited in this respect, an encoder may format three sub-blocks into a single code block. Here, a first sub-block may comprise an m-bit block of payload data. A second sub-block may comprise n/2 parity bits for the payload data, computed using a convolutional code. A third sub-block may comprise n/2 parity bits for a known permutation of the payload data, again computed using a convolutional code. Accordingly, two redundant but different sub-blocks of parity bits are packaged with a payload sub-block. It should be understood, however, that this is merely an example of a process of turbo encoding, and claimed subject matter is not limited in this respect.

"Space-time encoding" as referred to herein relates to a process of encoding information for transmission over multiple transmission elements (e.g., antennas) which are positioned in an array. In a particular embodiment, although claimed subject matter is not limited in this respect, space-time encoding may determine symbols that are to be transmitted through associated transmission elements and in particular defined time periods. However, this is merely an example of space-time encoding and claimed subject matter is not limited in this respect.

A "transformation" as referred to herein relates to a process by which a set of information and/or values as inputs are mapped to a set of information and/or values as outputs. In a particular embodiment, a transformation may comprise a "linear transformation" in which there is a linear relationship between inputs and outputs. For example, although claimed subject matter is not limited in this respect, such a linear transformation may determine output values based, at least in part, on scaling one or more input values by a scalar. In particular embodiments, such scalars may comprise real number components as well as imaginary components to provide "complex-valued" scalars. However, these are merely an example of a linear transformation and claimed subject matter is not limited in this respect.

According to an embodiment, although claimed subject matter is not limited in these respects, a linear transformation may comprise a "time-varying" linear transformation in which a particular linear relationship between input values and output values may change over time. In one particular example, although claimed subject matter is not limited in this respect, one or more scalars used for scaling input values may change over time. However, this is merely an example of how a time-varying linear transformation may be implemented and claimed subject matter is not limited in this respect.

As illustrated by V. Tarokh and A Seshadri in "Space-time codes for high data rate wireless communication: Performance criterion and code construction," IEEE Trans. On Info. Theory, vol. 44, pp. 744-765, March 1998, the use of space-time codes has been seminal in the advance of multiple input multiple output (MIMO) techniques. Space-time codes may apply to multiple transmit antennas to achieve both diversity and coding gains over fading channels. However, the design of full diversity codes with good coding gain has been challenging. One of the difficulties has been the lack of effective design tools to meet specified diversity and coding gains criteria. In most cases, to ensure meeting diversity and gain specifications, as illustrated by V. Tarokh and A Seshadri in "Space-time codes for high data rate wireless communication: Performance criterion and code construction," IEEE Trans. On Info. Theory, vol. 44, pp. 744-765, March 1998, exhaustive checks of all pairs of codewords may be employed, and numerical simulations may be employed to evaluate overall performance.

As illustrated below with reference to particular embodiments, the design of full diversity turbo space-time codes may be significantly simplified. Phase sweeping, as illustrated by A. Wittneben in "A new bandwidth efficient transmit antenna modulation diversity scheme for linear digital modulation," In Proc. IEEE ICC '93, vol. 3, pp. 1630-1634, May 1993, A Hiroike, F. Adachi and N. Nakajima in "Combined effects of phase sweeping transmitter diversity and channel coding," IEEE Trans. On Veh. Technol., vol. 41, pp. 170-176, May 1992, and B. Su and S. Wilson in "Phase sweeping transmitter diversity in mobile communications," in Proc. IEEE VTC '96, vol 1, pp. 131-135, April 1996, a precursor to space-time codes, enables full diversity, but no coding gain. Such phase sweeping techniques still attract attention both in academia and industry as illustrated by X. Ma and G. B. Giannakis in "Space-time-multipath coding using digital phase sweeping," In Proc. IEEE GLOBECOM '02, vol. 1, pp. 384-388, November 2002, and A. Gutierrez, J. Li, S. Baines, and D. Bevan in "An introduction to PSTD for is-95 and cdma2000," IEEE Wireless Communications and Networking Conference WCNC '99, vol. 3, pp. 1358-1362, September 1999. The approach described herein relates to, among other things, a technique related to phase sweeping and is referred to as time variant linear transformations (TVLT). W. Shi, C. Komninakis, R. Wesel, and B. Daneshrad in "Robustness of space-time turbo codes," in Proc. IEEE ICC '01, vol. 6, pp. 11-14, June 2001 discuss space-time turbo codes. According to an embodiment, TVLT may offer more flexibility for integration in space codes than phase sweeping. With TVLT, transmitted symbols may be modified by a unitary transformation represented by a unitary matrix. Elements of such a unitary matrix may in part selected at random (and/or using techniques to generate pseudo random values) and in part designed to meet the unitary conditions. Such a transformation may change at time intervals, but a sequence of transformations may be known to both a transmitter and a receiver.

Not only is TVLT capable of providing full diversity, in particular embodiments TVLT may provide coding gain with high probability. In particular, as illustrated herein, the probability of not meeting the coding gain specification may diminish exponentially with the Hamming distance between codewords, defined in particular embodiments as the number of different columns in pairs of codewords. Since turbo codes typically feature considerable Hamming distances, an exhaustive check of all pairs of codewords is not necessary.

In addition to simplifying design in particular embodiments, TVLT can also be used to constrict full diversity space-time codes with higher rate than codes with constant modulation, e.g., 4-PSK, at time intervals. The data rate limit derived in the aforementioned paper by V. Tarokh and A. Seshadri for a full diversity space-time codes is based on an assumption of constant modulation. TVLT has the effect of varying the modulation on time intervals and may lead to a higher realizable data rate. For example, full diversity space-time codes with 8-PSK modulation have a maximum rate of 3 b/s/Hz. Embodiments illustrated herein may achieve full diversity TVLT 8-PSK code with a rate of 4 b/s/Hz.

Also, embodiments illustrated herein show that turbo STC with TVLT lends itself to the application of a form of the extrinsic information transfer (EXIT) chart especially modified for the task. Such an EXIT chart may provide an efficient, low complexity method to quickly predict the performance of turbo STC. With this convenient tool, different designs and different codes may be compared.

According to a particular embodiment, a MIMO system may comprise M transmit and N receive antennas for transmitting information over block Rayleigh fading channel. However, such a Rayleigh fading channel is merely an example model of a communication channel according to a particular embodiment and claimed subject matter is not limited to any particular model of a communication channel. In the presently illustrated embodiment, a signal received at time interval t may be modeled in a particular embodiment according to relation (1) as follows:

$$r(t)=Hx(t)+n(t), \quad (1)$$

where $x(t)$ is the M×1 vector of the transmitted signal; $r(t)$ is the N×1 received signal vector; H is the N×M channel gain matrix, which consists of complex-valued scalars $h_{ij}$, i=1, . . . , N, j=1, . . . , M, modeled as zero-mean, mutually independent, identically distributed Gaussian random variable with unity variance. In a particular example, term $n(t)$ may comprise zero-mean, additive white Gaussian noise (AWGN) with variance M/(2SNR) per dimension, where SNR is the signal to noise ratio per symbol. With this model, a mean SNR at the receiver may be independent of a particular number of transmit antennas being employed.

Figure 1:
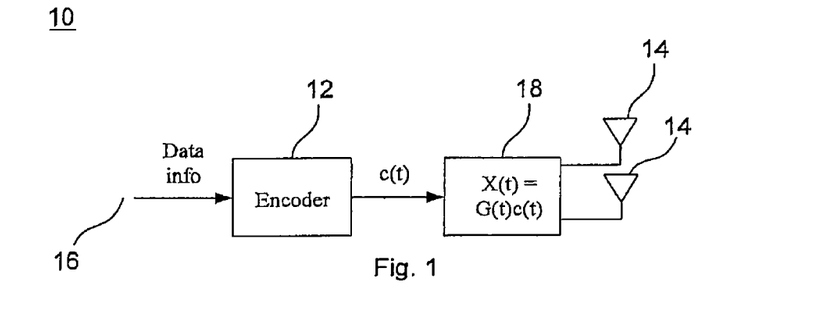
FIG. 1 is a schematic diagram of a transmission system according to an embodiment.

FIG. 1 shows a transmitter 10 that may employ TVLT according to a particular embodiment. One or more information streams 16 are received at encoder 12. In response, encoder 12 may produce a codeword denoted as C=[c(1), ..., c(L)], with L the codeword length. At time intervals t, t=1, ..., L, a vector of coded symbols c(t)=[c1(t), ..., cm(t)]$^T$ may be multiplied by a predetermined M×M unitary matrix G(t) at an encoder/modulator 18 to yield a vector of symbols x(t) and/or symbol streams defined by individual elements of x(t) over time, which is subsequently transmitted, as illustrated in relation (2) below.

$$x(t)=G(t)c(t). \quad (2)$$

A set of unitary matrices {G(t)}, where t=1 to L, may be generated randomly, independent of the codewords it is applied to. In an alternative embodiment, although claimed subject matter is not limited in this respect, elements of unitary matrices {G(t)} may be implemented by determining such elements based, at least in part, on values generated using techniques to generate pseudo random numbers subject to a unitary condition illustrated below. Once elements of unitary matrices {G(t)} are generated, {G(t)} may be stored both at a transmitter and at a receiver and it stays fixed for a duration of communication. Insofar as elements of G(t) are time-varying and realizations of random variables, x(t) may be subject to a time-varying, random and/or pseudo random modulation. At a receiver, a random code demapping may be carried out symbol by symbol rather than on long sequences.

According to an embodiment, such unitary matrices may be generated for an arbitrary number of transmit antennas. For p,q=1, ..., M, let $g_{p,q}(t)$ be the elements, and $g_q(t)$ be the columns of G(t). Since G(t) is unitary, it satisfies relation (3) as follows:

$$g_p^\dagger(t)g_q(t) = \begin{cases} 1 & p=q \\ 0 & p \neq q. \end{cases} \quad (3)$$

where the superscript "t" denotes transpose conjugate. Elements $g_{p,q}(t)$ may be generally, but not necessarily complex-valued. With such complex-valued elements in particular embodiments, then each G(t) may be specified by $2M^2$ real-valued parameters of which $M^2$ are prescribed by relation (3) and the rest are free, but constrained according to the expression $|g_{p,q}(t)|^2 \leq \|g_q(t)\|^2 = 1$. These requirements can be met by elements of the following form:

$$g_{p,q}(t)=\cos \alpha_{p,q}(t)e^{j\beta_{p,q}(t)},$$

where $\alpha_{p,q}(t), \beta_{p,q}(t) \in [0, 2\pi)$. Of these, $M^2$ are independent realizations selected from a uniform distribution over $[0, 2\pi)$ and the other $M^2$ terms may be found from relation (3). Of particular interest is the case M=2, for which we pick $\alpha_{11}(t)$, $\beta_{11}(t)$, $\beta_{12}(t)$, $\beta_{21}(t)$, and solve (3) for the rest to obtain relation (4) as follows:

$$G(t) = \begin{bmatrix} \cos\alpha_{11}(t)e^{j\beta_{11}(t)} & \sin\alpha_{11}(t)e^{j\beta_{12}(t)} \\ -\sin\alpha_{11}(t)e^{j\beta_{21}(t)} & \cos\alpha_{11}(t)e^{j(-\beta_{11}(t)+\beta_{12}(t)+\beta_{21}(t))} \end{bmatrix} \quad (4)$$

According to an embodiment, full diversity may be practically enabled employing turbo space-time codes with TVLT. In addition, if the minimum Hamming distance between pairs of space-time codewords is sufficiently large, the coding gain may exceed a prescribed threshold with high probability. In a particular embodiment, a Hamming distance between two codewords may be defined as a number of the columns that are different between the codewords. However, this is merely an example of a realization of a Hamming distance according to a particular embodiment and claimed subject matter is not limited in this respect. Finally, it can be illustrated that the throughput rate of these codes may exceed a maximum rate for conventional space-time codes derived in the aforementioned paper by V. Tarokh and A. Seshadri, "Space-time codes for high data rate wireless Communication: Performance criterion and code construction," *IEEE Trans. On Info. Theory*, vol. 44, pp. 744-765, March 1998.

In a particular embodiment, although claimed subject matter is not limited in this respect, two distinct codewords of a space-time code may be represented by the M×L matrices C=[c(1) ... c(L)] and B=[b(1) ... B(L)], respectively. According to rank criterion, such a code may achieve full transmit diversity if for every possible pair of codewords C and B, the error matrix E=[e(1), ..., e(L)], where e(t)=c(t)−b(t), has rank M (see, e.g., aforementioned paper by Tarokh and Seshadri). Here, it may be shown that full diversity is achievable. In a general case, however, ascertaining full diversity may be a cumbersome process that requires testing the rank of all pairs of codewords. When such tests fail, an encoder may be redesigned and the tests restarted. As illustrated in the aforementioned paper by Y. Liu, P. Fitz, and O. Y. Takeshita, "Full rate space-time turbo codes," *IEEE J. on Select. Areas Commun.*, vol. 19, pp. 969-980, May 2001, without the tedious check-adjust process, a turbo space-time code with a randomly picked interleaver usually fails to achieve full diversity.

As illustrated in the aforementioned paper of Tarokh and A. Seshadri, For a full diversity space-time code, the coding gain achieved by the pair B, C is $$\xi = (\lambda_1, \ldots, \lambda_M)^{1/M} = (\det(EE^\dagger))^{1/M}$$

where, $\lambda_1, \ldots, \lambda_M$ denote the M eigenvalues of $EE^t$. The coding gain of the space-time code is the minimum of $\xi$ sought over all pairs of codewords.

In a space-time code with TVLT, according to a particular embodiment for the purpose of illustration, two codewords may be $\overline{B}=[G(1)b(1), \ldots, G(L)b(L)]$ and, $\overline{C}=[G(1)c(1), \ldots, G(L)c(L)]$, respectively, and an associated error matrix $\overline{E}=[G(1)e(1), \ldots, G(L)e(L)]$. Here, $d_h$ may be the Hamming distance between B and C, e.g., the number of nonzero columns in E. It follows immediately that $d_h$ may also comprise the number of non-zero columns in $\overline{E}$ except for the occasion when $\overline{e}(t)=G(1)e(t)=0$, but e(t)≠0. Since the elements of the transformations $\{G(t)\}_{t=1}^L$ comprise realizations of random variables, with high probability, for $d_h \geq M$, rank $\overline{E}=M$, thus giving the code of full diversity.

In a particular embodiment, although claimed subject matter is not limited in this respect, linear transformations G(t) may affect the coding gain in a manner specified by the following theorem.

Theorem 1: Let B and C be a pair of M×L codewords with Hamming distance $d_h$. The value $d^2_{max}$ may comprise the largest Euclidean norm of all columns of E, i.e., $$d_{max}^2 = \max_{t=1,\ldots,L}\{\|e(t)\|^2\}, \text{ and } d_{min}^2|$$

be the smallest norm of nonzero columns of E, i.e., $$d_{min}^2 = \min_{t=1,\ldots,L}\{\|e(t)\|^2, \|e(t)\|^2 \neq 0\}.$$

With $\overline{B}$ and $\overline{C}$ the corresponding pair of codewords following TVLT, error matrices may be defined as $E=C-B$ and $\overline{E}=\overline{C}-\overline{B}$. If $\xi=(\det(\overline{EE}^t))^{1/M}$ comprises a coding gain achieved by $\overline{B}, \overline{C}$, then $Pt\{\xi<u\}$, the probability that the coding gain is lower than a given threshold u, where, $0<u<(d_{max}^2-(d_{min}^2)^{M-1})^{1/M}$ may decrease exponentially with $\lfloor d_h/(M-1) \rfloor$, where $\lfloor x \rfloor$ denotes the largest integer less than x.

Here, and without loss of generality, E may be rearranged such that the nonzero columns are listed first. In particular, let the first column be the one with the largest norm $d_{max}^2$. Then, following TVLT, we have $$\overline{E} = [G(1)e(1), \ldots, G(d_h)e(d_h), 0, \ldots, 0]$$

$$\triangleq [\overline{e}(1), \ldots, \overline{e}(d_h), 0, \ldots, 0].$$

Columns $\{\overline{e}(2), \ldots, \overline{e}(d_h)\}$ into $U=\lfloor d_h/(M-1) \rfloor$ may be partitioned into disjoint partitions, each partition containing $M-1$ columns. The partitions may be concatenated with the first column of $\overline{E}$ to construct U square matrices $V(\mu)$, $\mu=1, \ldots, U$. Each matrix $V(\mu)$ may be generated by a set of $(M-1)$ transformations $G(t)$. Since the first column is common to all $V(\mu)$, its transformation can be absorbed in the MIMO channel. Recalling that each $G(t)$ is obtained from $M^2$ realizations of a random variable, it follows that its domain is a hypercube with volume $(2\pi)^{M^2}$. Extending this reasoning to $V(\mu)$ its domain is a hypercube with volume $\Psi_\mu=(2\pi)^{(M-1)M^2}$.

The determinant $\det(V(\mu)^t V(\mu))$ comprises a continuous function of the angles forming the transformations $G(t)$, since its value is determined by trigonometric and exponential functions of these angles. Moreoever, $\det(V(\mu)^t V(\mu))$ is bounded as follows:

$$0 \leq \det(V(\mu)^\dagger V(\mu)) \leq \prod_{k=1}^{M}(V(\mu)^\dagger V(\mu))_{kk},$$

where $(V(\mu)^t V(\mu))_{kk}$ is an element on the diagonal of the matrix $(V(\mu)^t V(\mu))$ is an element on the diagonal of the matrix $(V(\mu)^t V(\mu))$.

The left hand side of the inequality follows from the non-negative property of a determinant of a Hermitian matrix, and the right hand side is a consequence of Hadamard's inequality. Direct evaluation shows that for any $\mu$, $$\prod_{k=1}^{M}(V(\mu)^\dagger V(\mu))_{kk} = d_{max}^2 \prod_{t=(\mu-1)(M-1)+1}^{\mu(M-1)}\|e(t)\|^2.$$

As the TVLT transformations $G(t)$ range through all possible values, $\det(V(\mu)^t V(\mu))$ may map onto all values between the two bounds.

Consequently, for any u, with $$0 < u^M < d_{max}^2(d_{min}^2)^{M-1} \leq d_{max}^2 \prod_{t=(\mu-1)\cdot(M-1)+1}^{\mu\cdot(M-1)}\|e(t)\|^2 :,$$

there exist a non-empty $\Upsilon_\mu$ region in $\Psi_\mu$ such that if the domain of $V(\mu)$, $A_\mu \in \Upsilon_\mu$, then $\det(V(\mu)^t V(\mu)) \geq u^M$. Let $\overline{\Upsilon}_\mu$ denote the complement region of $\Upsilon_\mu$, that is if $A_\mu \in \overline{\Upsilon}_\mu$, then $\det(V(\mu)^t V(\mu)) \geq u^M$. Let $\overline{\Upsilon}_\mu$ denote the complement region of $\Upsilon_\mu$ that is if $A_\mu \in \overline{\Upsilon}_\mu$, then $(V(\mu)^t V(\mu)) \geq \mu^M$. Then, if the volume of $\overline{\Upsilon}_\mu$ is denoted $\overline{\Upsilon}_\mu$, relation (5) provides as follows:

$$Pr\{\det(V(\mu)^\dagger V(\mu)) < u^M\} = \frac{|\overline{\Upsilon}_\mu|}{(2\pi)^{(M-1)M^2}} < 1. \quad (5)$$

Providing that $\det(\overline{EE}^t) \geq \det(V(\mu)^t V(\mu))$, $\mu=1, \ldots, U$, relation (6) provides as follows:

$$Pr\{\xi < u\} = Pr\{\det(\overline{EE}^\dagger) < u^M\} \leq \quad (6)$$

$$Pr\left\{\begin{array}{l}\det(V(1)^\dagger V(1)) < u^M, \ldots, \\ \det(V(U)^\dagger V(U)) < u^M\end{array}\right\}$$

$$= \prod_{\mu=1}^{U} Pr\{\det(V(\mu)^\dagger V(\mu)) < u^M\}$$

$$= \prod_{\mu=1}^{U} \frac{|\overline{\Upsilon}_\mu|}{(2\pi)^{(M-1)M^2}} \leq r^{\lfloor d_h/(M-1) \rfloor},$$

where $$r = \max_{\mu=1,\ldots,U}\left\{\frac{|\overline{\Upsilon}_\mu|}{(2\pi)^{(M-1)M^2}}\right\}. \quad (7)$$

In relation (6), the third line follows since $\{V(\mu), \mu=1, \ldots, U\}$ are independent. In the third line of relation (6) line 5, we recall that $U=\lfloor d_h/(M-1) \rfloor$.

It can be shown that the probability that a coding gain falls below a set value vanishes exponentially with the ratio $\lfloor d_h/(M-1) \rfloor$. It follows that a desired feature of space-time codes with TVLT is a large Hamming distance. Conventional space-time trellis codes, such as those proposed in the aforementioned paper by V. Tarokh and A. Seshadri, generally do not satisfy a large Hamming distance requirement. That means that application of TVLT to such codes could potentially result in a low coding gain. Although not much is known on efficient methods to calculate the minimum Hamming distances for arbitrary, non-binary turbo space-time codes, such codes usually feature relatively large minimum Hamming distances. Even when there are low weight codewords (leading to low Hamming distances), their number is typically small and they do not have a significant impact on performance as illustrated by L. C. Perez, J. Seghers, and D. J. Costello, Jr. in "A distance spectrum interpretation of turbo codes," *IEEE Trans. On Info. Theory*, vol. 42, pp. 1698-1709, Nov. 1996. The calculation of $d_{h,min}$ for binary turbo codes is better known. For example, as illustrated by A. Perotti and S.

Benedetto in "A new upper bound on the minimum distance of turbo codes," to appear in *IEEE Trans. on Info. Theory*, it is shown that for a rate ½, eight-state binary turbo code with convolutional component codes and interleaver size 1000, the upper bound on the minimum Hamming distance is about 100. Techniques have been published in literature for optimizing the Hamming distance in binary codes such as in M. Breiling, S. Peeters, and J. Huber, "Interleaver design using backtracking and spreading methods," in *Proc. Int. Symp. Info. Theory*, p. 451, June 2000, and O. Y. Takeshita and D. J. Costello Jr., "New deterministic interleaver designs for turbo codes," *IEEE Trans. on Info. Theory*. Vol. 51, pp. 1988-2006, September 2000. However, it is unknown whether these methods extend to non-binary codes.

According to Theorem 3.3.1 and Corollary 3.3.1 in the aforementioned article by V. Tarokh and A. Seshadri, for M transmit and N receive antennas of a MIMO system, and signal constellation size $2^b$, the full diversity of MN can be achieved with a maximum rate of b bits/s/Hz. Inspection of a proof provided in the reference may reveals that the rate limit is a consequence of the restriction of constant modulation during the codeword. With TVLT, on the other hand, this restriction is removed since the modulation constellation changes on time intervals. Consequently, a new rate derivation may be provided for space-time codes with TVLT.

In a particular embodiment, it can be shown that a characterization of space-time codes with TVLT may be completed by establishing a code rate and its relation to the Hamming distance. In a particular embodiment, for example, a space-time code may be developed for M transmit antennas and a signal constellation Q (before TVLT application) with cardinality $|Q|=2^b$ elements. Let L denote the codeword length. Then a maximum rate of a code with minimum Hamming distance $d_{h,min}$ may be expressed as follows:

$$R \le Mb - \frac{1}{L}\log_2 V,$$

in bits per channel use, where $$V = \sum_{j=0}^{d_{h,min}} \binom{L}{j}(2^{Mb} - 1)^j.$$

The columns of the M×L space-time codeword matrix may comprise supersymbols defined over a superalphabet constellation $Q^M$ with $|Q^M|=2^{Mb}$. A codeword can be viewed as an L-tuple in a L-dimensional space $[Q^M]^L$. The sphere-packing bound as illustrated by S. G. Wilson in "Digital modulation and coding," Prentice-Hall, Inc., pp. 432-434, 1996, can be applied to obtain the maximum rate. Analogizing a ball of radius $d_{h,min}$, a number of such points is given as follows:

$$V = \sum_{j=0}^{d_{h,min}} \binom{L}{j}(2^{Mb} - 1)^j.$$

Associating one such ball with each codeword, a total number of L-tuples is $(2^{Mb})^L$. Then a maximum number of valid codewords separated by at least $d_{h,min}$ is $$A = \frac{(2^{Mb})^L}{V}.$$

Hence, a maximum transmission rate may be expressed as follows:

$$R \le \frac{1}{L}\log_2 A = Mb - \frac{1}{L}\log_2 V.$$

In a particular example, for the purpose of illustrating a particular embodiment and claimed subject matter is not limited in this respect, a turbo-STC may be defined with M=2, L=1024, b=3 (8-PSK modulation), and $d_{h,min}=12$. Then as illustrated above, the maximum rate is 5.84 bits/channel use, which for PSK corresponds to the same number of bits/secs/Hz. According to the aforementioned paper by V. Tarokh and A. Seshadri, with constant modulation, the maximum rate for a full diversity code is 3 b/s/Hz. As illustrated below according to a particular embodiment a rate 4 b/s/Hz code with 8PSK modulation enables full diversity.

In a particular embodiment, at a transmitter, one additional matrix multiplication may be used for every symbol interval. Also, in a particular embodiment, at the receiver an additional matrix multiplication may be used for every symbol interval compared to codes without TVLT.

Conventional space time codes with full diversity and high coding gain are typically either hand designed, as illustrated in the aforementioned paper by V. Tarokh and A. Seshadri, or found by exhaustive search as illustrated in S. Baro and G. Bauch, "Improved codes for space-time trellis-coded modulation," IEEE Commun. Lett., vol. 4, pp. 20-22, January 2000. In the discussion above, it is shown that turbo-STC with TVLT may obtain full diversity and a high probability of coding gain. Also, an analysis tool may be used to facilitate "tweaking" the design. Such a tool exists for binary as illustrated by S. T. Brink in "Convergence behavior of iterative decoded parallel concatenated codes," IEEE Trans. On Commun., vol. 49, pp. 1727-1737, October 2001, for non-binary as illustrated by A. Grant in "Convergence of non-binary iterative decoding," in Proc. IEEE GLOBECOM '01, VOL. 2, PP. 1058-1062, November 2001, and coded modulation as illustrated by H. Chen and A. Haimovich, "EXIT charts for turbo trellis coded modulation," To appear on the November issue of IEEE Commun. Lett., 2004, in the form of the EXIT chart. Here, the EXIT chart method may be extended to the turbo space-time code with TVLT and used to predict convergence behavior of the turbo decoder.

As illustrated below according to particular embodiments, code performance of TVLT may depend on the M singular values of the channel matrix H rather than the channel matrix itself. Later in this discussion, codes for two transmit antennas will be considered exclusively for the purpose of illustration. It should be understood, however, that this technique may be extended to systems employing three or more antennas. For this case, we will show that the M=2, the EXIT chart can be applied to find the convergence region defined on the 2-D plane of the channel singular values. Finally, we will show how the chart can be applied to predict code performance.

Generally speaking, space-time codes are multidimensional codes as illustrated by G. Ugerboeck, "Channel coding with multilevel/phase signals," IEEE Trans. on Info, Theory, vol. 28, pp. 55-67, January 1982, and by S. S. Pietrobon, R. H. Deng. A. Lafanachere, G. Ungerboeck, and D. J. Costello, Jr., "Trellis-coded multidimensional phase modulation," IEEE Trans. on Info Theory, vol. 36, pp. 63-89, January 1990, with the additional constraint of rank criterion. With TVLT, according to a particular embodiment, full diversity may be achieved without meeting such rank criterion.

Figure 2:
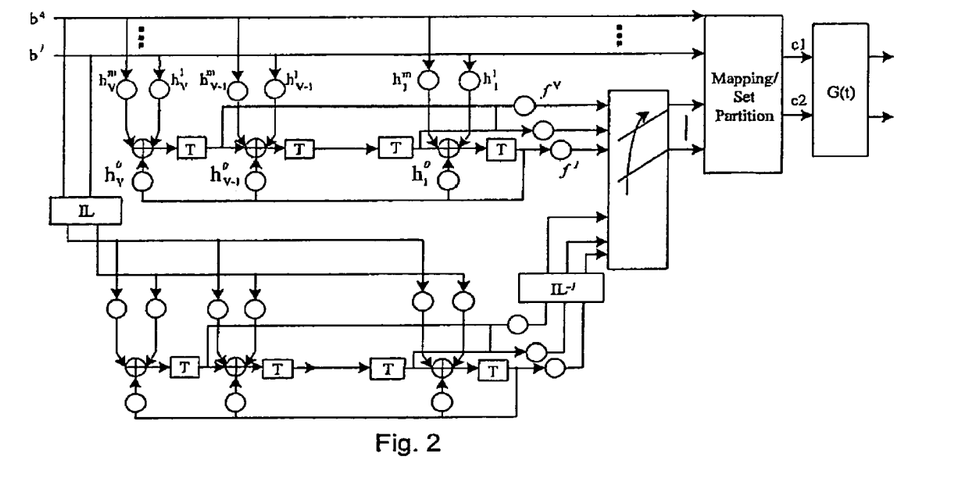
FIG. 2 is a schematic diagram of an encoder according to an embodiment.

FIG. 2 shows a schematic diagram of a turbo space-time code encoder with TVLT according to a particular embodiment. In the particularly illustrated embodiment, component encoders may comprise two identical, recursive, systematic convolutional (RSC) encoders. However, other embodiments may employ more than two encoders and claimed subject matter is not limited in this respect. The output parity bits of the two RSCs may be alternatively punctured. In the particularly illustrated embodiment, the mapping from the coded bits to symbols may comprise a 4-D set partition.

Several new turbo codes are introduced in this paper for which the component encoders are listed in Table I below.

TABLE I

| Code | m | v | $H^0(D)$ | $H^1(D)$ | $H^2(D)$ | $H^3(D)$ | $H^4(D)$ | F (D) |
|---|---|---|---|---|---|---|---|---|
| (1) | 2 | 3 | $6_8$ | $1_8$ | $2_8$ | | | $3_8$ |
| (2) | 3 | 4 | $10_8$ | $01_8$ | $02_8$ | $04_8$ | | $07_8$ |
| (3) | 4 | 4 | $10_8$ | $01_8$ | $02_8$ | $04_8$ | $10_8$ | $03_8$ |

The notation used in the table and FIG. 2 follows notation employed in G. Ugerboeck, "Channel coding with multilevel/phase signals," IEEE Trans. on Info, Theory, vol. 28, pp. 55-67, January 1982. The quantities m and u denote the number of input information bits (e.g., from one or more information streams) and the constraint length, respectively. Each circle in FIG. 2 represents a switch. The binary variable next to each switch, $\{h_i^j, i=1, \ldots, u, j=0, \ldots m\}$ or $\{f^k, k=1, \ldots, u\}$, may indicate whether the switch is in the "on" position. For compact representation, the polynomial notation $H^j(D)$ is used to indicate the connections of the input bit j to the mod 2 adders of the convolutional code as follows:

$$H^j(D) = \sum_{i=1}^{v} h_i^j D^i.$$

Feedback is represented by $H^0(D)$ while feedforward is represented by F(D) as follows:

$$F(D) = \sum_{k=1}^{v} f^k(D).$$

All numbers shown in the table are octal according to a particular embodiment. For example, for Code 3, the $H^3(D)$ coefficients are $(04)_8=(001000)_2$. Then $$H^3(D)=1\cdot D^2+0\cdot D^2+0\cdot D^1+0\cdot D^0,$$

or $h_1^3=0$, $h_2^3=0$, $h_3^3=0$, and $h_4^3=1$.

Figure 3:
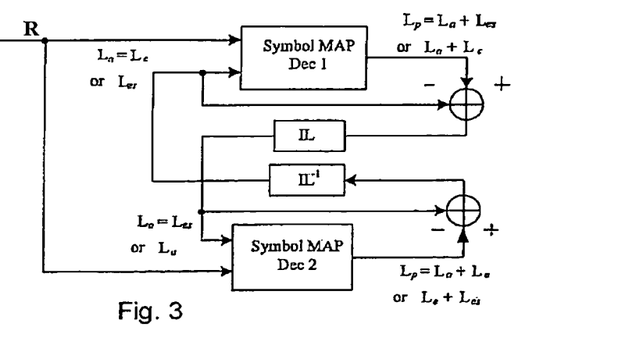
FIG. 3 is a schematic diagram of a decoder according to a an embodiment.

According to a particular embodiment, although claimed subject matter is not limited in this respect, a schematic diagram of a turbo space-time decoder is shown in FIG. 3 which comprises two MAP decoders, which exchange extrinsic information. Here, it should be noted that with this particular embodiment of the binary turbo decoder is that the information passed from one component decoder to another may comprise a mixture of extrinsic and systematic information, as discussed below. In a binary turbo decoder according to a particular embodiment, the information exchanged between component decoders may contain only extrinsic information.

In a particular embodiment, $L_p$ and $L_a$ may denote respectively, the a posteriori and a priori information in log-likelihood form. In any one of the illustrated component decoders, according to a particular embodiment, there are two possible cases: (i) at time t the parity bits from the corresponding component encoder are transmitted; (ii) at time interval t the parity bits from the encoder are punctured. Then the a posteriori information can be expressed in relation (8) as follows:

$$L_p(t) = \begin{cases} L_a(t) + L_{es}(t), & (i) \\ L_a(t) + L_e(t), & (ii), \end{cases} \quad (8)$$

where $L_e(t)$ denotes extrinsic information and $L_{es}(t)$ denotes a mixture of extrinsic and systematic (intrinsic) information. The expression for the a priori information may be expressed in relation (9) as follows:

$$L_a(t) = \begin{cases} L_{es}(t), & (ii) \\ L_e(t), & (i), \end{cases} \quad (9)$$

Additional details may be found in one or more references cited above. These differences with binary turbo decoder lead to differences in the generation of the EXIT charts for turbo-STC.

Effects of TVLT on the channel model of a particular embodiment according to relation (1) as discussed below. A singular value decomposition (SVD) of the channel gain matrix H may be provided as $H=U\Sigma W^t$, where U is a unitary N×N matrix and for, M=2, and W is unitary 2×2 matrix. The diagonal matrix $\Sigma$ may contain singular values of H. Accordingly, the channel model of relation (1) may become as illustrated in relations (10) and (11) below:

$$r(t)=U\Sigma W^t G(t)c(t)+n(t) \quad (10)$$

or $$U^t r(t)=\Sigma W^t G(t)c(t)+U^t n(t). \quad (11)$$

Here, y(t) may be expressed as $y(t)=U^t r(t)$, and $Q(t)=W^t G(t)$, with Q(t) being a random unitary matrix that changes on time intervals. Also, the noise term may be modeled as $\eta(t)=U^t n(t)$. Accordingly, relation (12) below may provide an equivalent channel model according to a particular embodiment.

$$y(t)=\Sigma Q(t)c(t)+\eta(t). \quad (12)$$

Since Q(t) may change randomly according to the particular embodiment outlined above, an equivalent channel model may comprise a "forced fast fading" channel. When the transmitted codeword is infinitely long, according to a particular embodiment, it may experience all possible values of Q(t). Consequently, the channel state may be parameterized only by $\Sigma$, or equivalently by two singular values $\sigma_1$ and $\sigma_2$. If the codeword is long enough, the performance of a code may be invariant over different channels, which may then have the same singular values.

By applying TVLT according to a particular embodiment, a number of parameters needed to characterize a 2×N channel may be reduced to one or two real numbers. In contrast, without TVLT, the channel may be characterized by 2N complex numbers. This reduction makes it practical to apply to EXIT chart to the analysis of turbo-STC as shown below.

As illustrated by S. T. Brink in "Convergence behavior of iterative decoded parallel concatenated codes," IEEE Trans. On Commun., vol. 49, pp. 1727-1737, October 2001, A. Grant in "Convergence of non-binary iterative decoding," in Proc. IEEE GLOBECOM '01, VOL. 2, PP. 1058-1062, November 2001, H. E. Gamal and A. R Hammons in "Analyzing the turbo decoder using Gaussian approximation," IEEE Trans. on Info Theory, vol. 47, pp. 671-686, February 2001, and D. Divsalar, S. Donlinar, and F. Pollara in "Iterative turbo decoder analysis based on density evolution," IEEE J. on Select. Areas Commun., vol. 19, pp. 891-907, May 2001, the EXIT chart method may provide a convenient, low complexity tool to analyze the convergence of iterative decoding and predict performance of turbo codes. The turbo decoder, according to a particular embodiment, may comprise two component maximum a posteriori (MAP) decoders, which may exchange extrinsic information as iteration proceeds. Convergence to correct decisions at a component decoder may depend on whether the component decoder can generate better extrinsic information than it receives from another component decoder. In a particular embodiment, one assumption of this method is that the codeword length or interleaver size are long enough such that the extrinsic information log-likelihood (LLRs) for different time intervals are independent as illustrated by S. T. Brink in "Convergence behavior of iterative decoded parallel concatenated codes," IEEE Trans. On Commun., vol. 49, pp. 1727-1737, October 2001.

According to an embodiment, an EXIT chart may comprise a graphical representation of a relationship between inputs and outputs of a decoder obtained through simulations. Since two component decoders may be the same in a particular embodiment, only one decoder needs to be tested in such an embodiment. To perform a test of a component decoder, the component decoder may be fed with the a priori LLRs of transmitted data symbols as if they are passed from another component decoder. The component decoder may also be fed with channel observations, generated according to a given channel model $\mathcal{H}$ and SNR. The component decoder may be executed and extrinsic information may be measured at its output. An EXIT chart may then plot the function of the following relation (13):

$$I_{out}=f(I_{in}, \mathcal{H} \text{SNR}), \qquad (13)$$

where $I_{in}$ comprises mutual information between the transmitted data symbol and a priori information (in LLR form), and $I_{out}$ comprises mutual information between the transmitted data and the output extrinsic information (also in LLR form).

In a particular application, an EXIT chart method may predict the performance of turbo codes. For a single antenna AWGN channel, $\mathcal{H}$ can be described by a unit gain. Accordingly, an EXIT chart may comprise a plot of the function $$I_{out}=f(I_{in}, \text{SNR}) \qquad (14)$$

For a given SNR, different tests may be performed for different $I_{in}$. According to a particular embodiment, although claimed subject matter is not limited in this respect, if a property of the following relation (15) exists:

$$I_{out}>I_{in}, \forall I_{in} \geq 0, \qquad (15)$$

then a decoder may converge to correct decisions with high probability. It has been shown by S. T. Brink in "Convergence behavior of iterative decoded parallel concatenated codes," IEEE Trans. On Commun., vol. 49, pp. 1727-1737, October 2001 that $I_{out}$ comprises a nondecreasing function of SNR. According to an embodiment, although claimed subject matter is not limited in this respect, by generating the EXIT charts as per relation (14) for increasing SNR values, a threshold $SNR_{th}$ can be found such that if $SNR>SNR_{th}$ then relation (15) holds, and the decoder converges. The usefulness of $SNR_{th}$ is to predict the beginning of a waterfall region of resulting bit error rate (BER).

For a single input output (SISO), block fading channel, the channel $\mathcal{H}$ can be modeled by a complex scalar $h$ that may follow some distribution and changes independently between codewords.

According to an embodiment, an EXIT chart may plot the function $$I_{out}=f(I_{in}, |h|^2 \text{SNR}).$$

Here, a threshold $SNR_{th}$ found from such an EXIT chart in the AWGN channel can be used to predict the frame error rate (FER) over the block fading channel. A convergence region for the SISO, block fading channel may be expressed as $\{h||h|^2>SNR_{th}/SNR\}$. According to an embodiment, a frame error rate may represent a probability that a channel gain falls into the region where the decoding fails to converge, $$FER = Pr\left\{|h|^2 < \frac{SNR_{th}}{SNR}\right\}.$$

For an M×N MIMO, block fading channel, an EXIT chart may comprise a plot of $$I_{out}=f(I_{in}, H^tH \text{SNR}).$$

Since H may be constituted from 2×M×N real numbers according to a particular embodiment, the region of convergence may be defined in a 2×M×N-dimensional space. Even for M=2, N=1, searching the threshold boundary of a four-dimensional space may be impractical. MIMO block fading channel in a particular embodiment may be transformed into an equivalent forced fast fading channel, which can be parameterized by the eigenvalues of $H^tH$ SNR (or the singular values of the channel gain matrix H). For M=2, there are at most two eigenvalues. Here, accordingly, an EXIT chart may comprise a plot of the function $$I_{out}=f(I_{in}, \lambda_1, \lambda_2),$$

Where $\lambda_1$ and $\lambda_2$ are the eigenvalues of $H^tH$ SNR. According to an embodiment, an EXIT chart may be used to find a region of convergence on a 2-D plane defined by the two eigenvalues $\lambda_1$ and $\lambda_2$. The values that lie outside the region of convergence can be used to predict the FER performance of turbo space-time codes with TVLT. Additional examples are illustrated below.

To generate the EXIT chart for turbo-STC with TVLT, an approach similar to an approached proposed by H. Chen and A. Haimovich in "Exit charts for turbo trellis coded modulation," to appear on the November issue of *IEEE Commun. Lett.*, 2004 for SISO turbo trellis coded modulation may be taken. An input to a component MAP decoder may be either generated as pure extrinsic information or synthesized as a mixture of extrinsic and systematic information as illustrated in relation (9). Also, an output of such a component MAP decoder may comprise either pure extrinsic information or a mixture of extrinsic and systematic information as per relation (8). In the latter case, such systematic information may be removed before extrinsic information is measured. Synthesis and separation of extrinsic information and systematic information illustrate a significant difference between EXIT charts for binary and space-time turbo codes.

Figure 4:
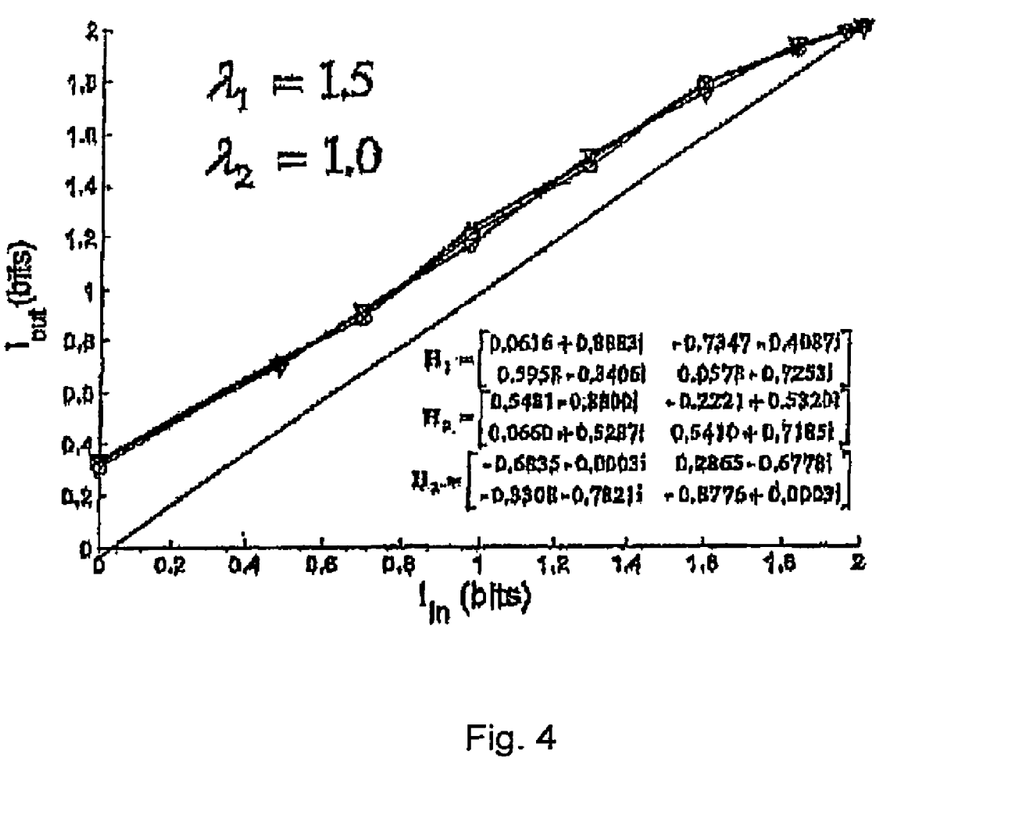
FIG. 4 is a plot providing examples of EXIT charts of turbo-STC with TVLT according to an embodiment.

FIG. 4 provides an example of an EXIT charts of turbo-STC with TVLT according to a particular embodiment for three fixed and different channel realizations, but with the same pair of channel eigenvalues, $\lambda_1=1.5$, $\lambda_2=1.0$. The code represented is Code 1 in Table I. In this figure, $I_{in}$ and $I_{out}$ are measured in bits-per-channel-use and label the abscissa and ordinate, respectively. The three curves are plots of $I_{out}=f(I_{in}, H)$ parameterized by channel realizations. Since each transmission includes two information bits, $I_{in}$ and $I_{out}$ are in the range [0, 2] bits. FIG. 4 shows that the three EXIT curves almost overlap one another.

According to an embodiment, an EXIT chart may be generated for analyzing convergence of turbo-STC with TVLT and for evaluating the FER performance over a fading channel. Here, $I_{out}$ may denote mutual information between transmitted data symbol and output extrinsic information from a MAP decoder. Also, $I_{in}$ may denote mutual information between the transmitted data symbol and the input a priori information to the MAP decoder. Considering a particular embodiment having a channel model according to relation according to relation (10) with M=2 and $\Sigma=\text{diag}(\sqrt{\lambda_1}, \sqrt{\lambda_2})$, where diag ( ) denotes a diagonal matrix, $I_{out}=f(I_{in}, \lambda_1, \lambda_2)$ comprises a nondecreasing function of both $\lambda_1$ and $\lambda_2$. The channel model (10) can be regarded as an equivalent AWGN channel with symbols transformed by $U\Sigma W^t G(t)$. It may be shown that in this AWGN channel, Euclidean distance between symbols is an increasing function of the eigenvalues $\lambda_1$ and $\lambda_2$. According to an embodiment, and without loss of generality, a scenario may provide that only $\lambda_1$ has been increased to $\lambda_1+\Delta$, $\Delta>0$. The expression $d^2(\lambda_1, \lambda_2)$ and $d^2(\lambda_1+\Delta, \lambda_2)$ may denote such respective Euclidean distances. Accordingly, for $\forall U, W, c_1(t), c_2(t), \lambda_1$, and $\lambda_2$, $$\begin{aligned}d^2(\lambda_1+\Delta, \lambda_2) &\triangleq \|U\text{diag}(\sqrt{\lambda_1+\Delta}, \sqrt{\lambda_2})W^\dagger G(t)(c_1(t)-c_2(t))\|^2 \\ &= \|U\text{diag}(\sqrt{\lambda_1}, \sqrt{\lambda_2})W^\dagger G(t)(c_1(t)-c_2(t))\|^2 + \\ &\quad \|U\text{diag}(\sqrt{\Delta}, 0)W^\dagger G(t)(c_1(t)-c_2(t))\|^2 > \\ &\quad \left\|U\sum_1 W^\dagger G(t)(c_1(t)-c_2(t))\right\|^2 \\ &= d^2(\lambda_1, \lambda_2).\end{aligned}$$

For particular embodiments with higher eigenvalues, a MAP decoder may produce a lower bit error rate (BER). If a smaller eigenvalue was employed for increasing the mutual information, for example, the two scenarios can be made equivalent by injecting noise to match the increase in Euclidean distance. Such injected noise would, however, increase the BER, which may contradict an objective of the MAP decoder. Thus MAP optimality may dictate that extrinsic information is non-decreasing with eigenvalues.

Figure 5:
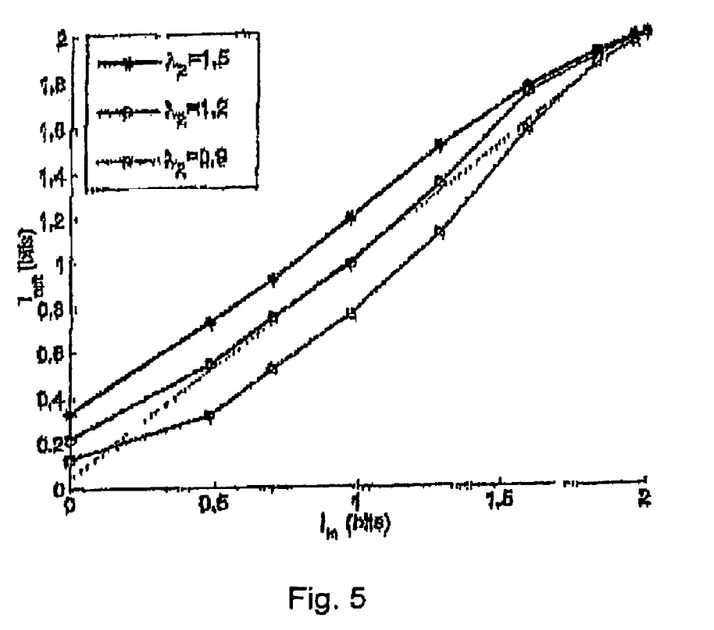
FIGS. 5 and 6 are plots of eigenvalues relating to detection of information according to an embodiment.
Figure 6:
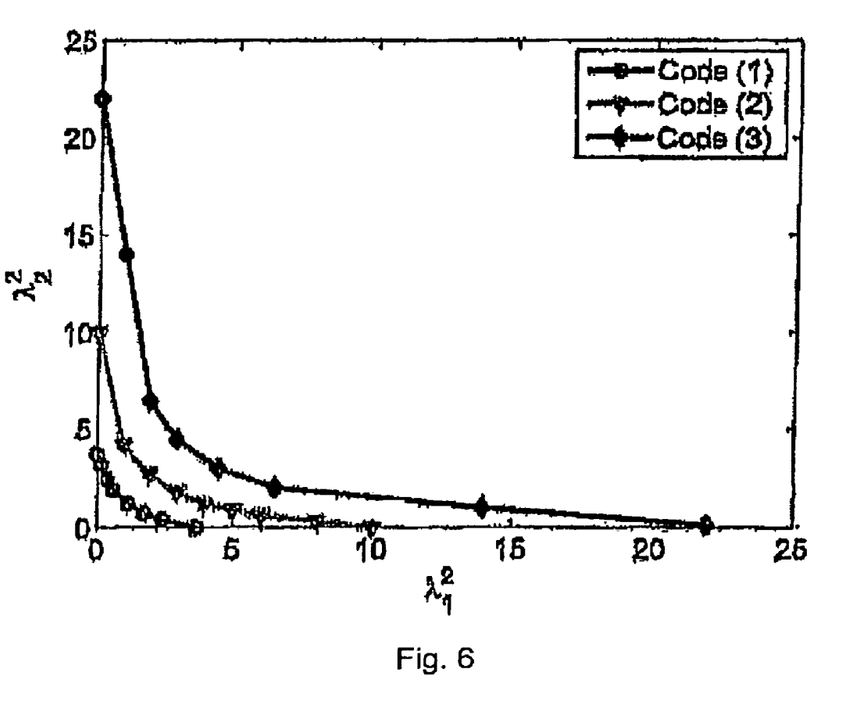

Hence, given a particular $\lambda_1$ in the presently illustrated embodiment, there may exist a minimum $\lambda_2$, denoted $\lambda_{2,min}$ ($\lambda_1$), such that if $\lambda_2 > \lambda_{2,min}(\lambda_1)$, then $I_{out} > I_{in}$, $\forall I_{in} \geq 0$, which enables convergence of the decoder. The value of $\lambda_{2,min}(\lambda_1)$ may be determined by gradually increasing $\lambda_2$ from a small value, until $I_{out}$ climbs above the diagonal line. An example for Code 1 is shown in FIG. 5. For $\lambda_1=1$, $\lambda_{2,min}(1)$ is found to be 1.2. Repeating the process of setting the value of $\lambda_1$ and evaluating $\lambda_{2,min}(\lambda_1)$ by the EXIT chart may provide a $\lambda_1$-$\lambda_2$ characteristic. In FIG. 6, according to a particular embodiment, there are shown $\lambda_1$-$\lambda_2$ characteristics of the three codes listed in Table I having rates of 2, 3, and 4 b/s/Hz, respectively. For each code, an area above the curve may comprise a region of convergence. Here, accordingly, a higher the data rate of a code may provide a smaller convergence region. In addition to displaying the region of convergence, the $\lambda_1$-$\lambda_2$ characteristic may provide a convenient way to compare and select turbo space-time codes with TVLT, by quickly predicting the FER performance of the different codes, as shown below.

According to an embodiment, although claimed subject matter is not limited in this respect, $\lambda_1$-$\lambda_2$ characteristics described previously may be applied to evaluate the FER of turbo-STC with TVLT. For a 2×N Rayleigh fading channel, where N≧2, as a particular example, a joint distribution of the eigenvalues of $H^tH$ SNR, according to M. Chiani, M. Z. Win. A Zanella, and J. H. Winters in "Exact symbol error probability for optimum combining in the presence of multiple cochannel interferers and thermal noise," in Proc. IEEE GLOBECOM '01, vol 2, pp. 1182-1186, 2001, may be given as follows:

$$p(\lambda_1, \lambda_2) = \frac{1}{2SNR^2}\exp\left(-\frac{1}{SNR^3}(\lambda_1+\lambda_2)(\lambda_1+\lambda_2)^2\right). \tag{16}$$

Here, a region of non-convergence may be denoted as $\Gamma$. The FER of the code at a given signal to noise ratio SNR may comprise the integration of $p(\lambda_1, \lambda_2)$ over such a region of non-convergence such as shown in FIG. 6 as illustrated in relation (17) below.

$$FER = \int\int_\Gamma p(\lambda_1, \lambda_2)\,d\lambda_1 d\lambda_2. \tag{17}$$

In particular embodiments, the integration in relation (17) can be solved either analytically or numerically. The accuracy of relation (17) may be illustrated below by comparison to simulation results.

An analytical expression of the FER can be found for the 2×1 channel according to an embodiment. In this case, $H^tH$ SNR may comprise a single eigenvalue. A channel matrix H may be expressed as $H=[h_1\ h_2]^T$, then $\lambda=(|h_1|^2+|h_2|^2)SNR$. For Rayleigh fading according to a particular embodiment, the eigenvalue $\lambda$ may follow a chi-square distribution with four degrees of freedom $$p(\lambda) = \frac{1}{2SNR^2}\lambda e^{-\lambda/SNR}. \tag{18}$$

In the particular embodiment of FIG. 6, a minimum value of $\lambda$ for which the code converges is the point $(0, \lambda_{2,min})$ which may be denoted as value $\lambda_{th}$. FIG. 6 graphically illustrates this value for Code 1 of Table I as $\lambda_{th} \approx 3.8$. Accordingly, an FER may be expressed in relation (19) as follows:

$$FER = \int_0^{\lambda_{th}} p(\lambda)\,d\lambda$$

-continued $$= \int_0^{\lambda_{th}} \frac{4}{\gamma^2} \lambda^2 \exp\left(-\frac{2\lambda^2}{\gamma}\right) d\lambda^2$$

$$= 1 - \left(\frac{\lambda_{th}}{SNR} + 1\right)\exp\left(-\frac{\lambda_{th}}{SNR}\right).$$

Provided below are numerical results for particular codes with TVLT (as shown in Table I). Performance of such codes is also compared to the case when no TVLT is applied. In a particular embodiment for the purpose of illustration, an interleaver length may be 1024 for all codes. In this particular embodiment, performance is measured in terms of the FER versus SNR. However, different metrics may be used to evaluate performance and claimed subject matter is not limited in this respect.

Figure 7:
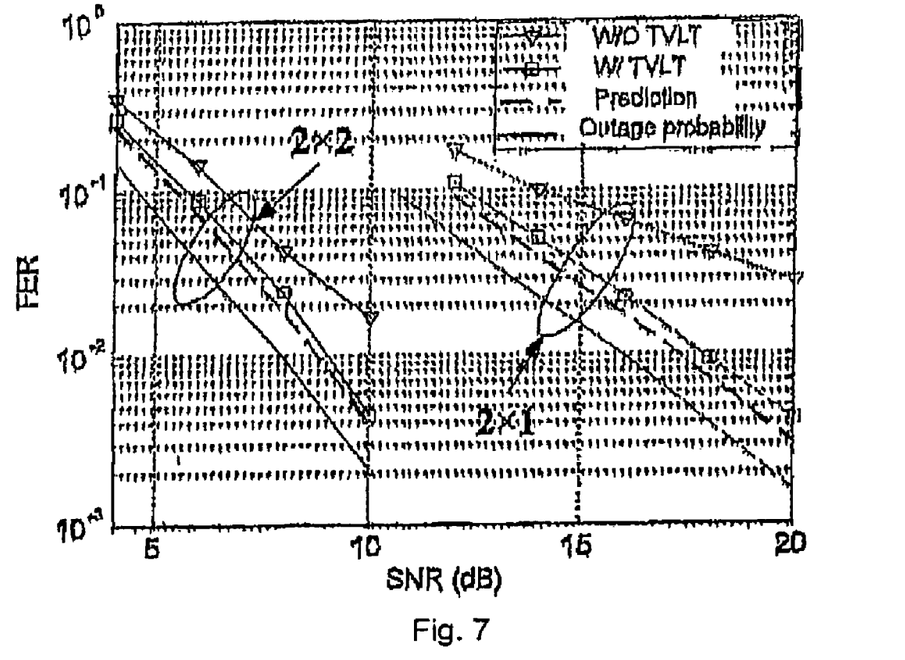
FIGS. 7-9 are plots of frame error rates (FER) versus signal to noise ratio (SNR) according to an embodiment.

Performance of Code 1, with a spectral efficiently of 2 b/s/Hz with 4-PSK modulation is shown in FIG. 7, for both 2×1 and 2×2 configurations and with and without TVLT. It may be observed that with TVLT, the code has a steeper FER decline with SNR, and both 2×1 and 2×2 configurations are visually parallel with the outage probability curves. Without TVLT, the codes display a marked loss in diversity gain in both configurations. The turbo-STC with TVLT gap to outage capacity is about 1-1.5 dB. This example demonstrates the ability of TVLT to provide full diversity gains (as discussed above). The FER curve obtained from a $\lambda_1$-$\lambda_2$ characteristic is also shown in FIG. 7. It may be observed that a prediction fits the simulation sufficiently well and can be used as a quick tool to evaluate performance of turbo space-time codes.

Figure 8:
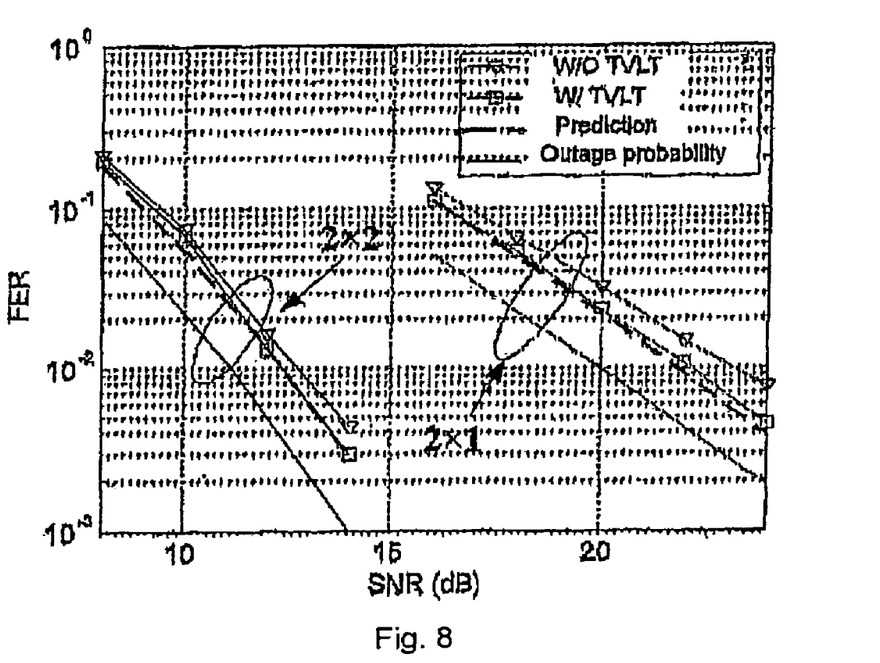

Performance of the 8-PSK, 3 b/s/Hz Code 2, according to a particular embodiment, is illustrated in FIG. 8 for a case similar to those in FIG. 7. It may be observed that Code 2 loses diversity gain in the absence of TVLT, but that the loss is not as marked as the case of Code 1. A possible explanation is that the 8-PSK modulation here achieves a better rank of the error matrix than the 4-PSK modulation of Code 1. In fact, this observation reinforces the benefit of TVLT, which achieves the rank criterion through diversity of the modulation. Also, it may be observed from FIG. 8 that the FER predicted from the EXIT chart is reasonably close match with the simulation results.

Figure 9:
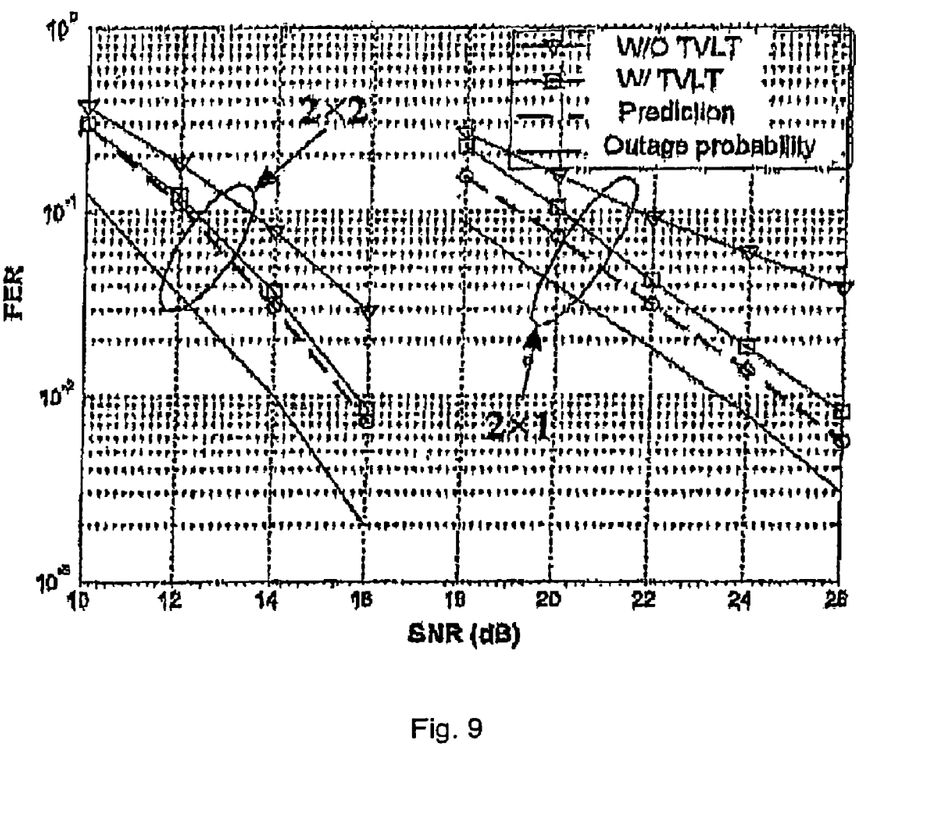

FIG. 9 illustrates an analysis of performance of Code 3. Here, this code may achieve a spectral efficiency of 4 b/s/Hz with 8-PSK modulation. As such, this code may break the rate limit of full diversity space-time codes with fixed modulation, which for 8-PSK is shown to be 3 b/s/Hz by V. Tarokh and A. Seshadri in "Space-time codes for high data rate wireless Communication: Performance criterion and code construction," IEEE Trans. On Info. Theory, vol. 44, pp. 744-765, March 1998. Conversely, codes at 4 b/s/Hz cannot achieve full diversity as evident for the code without TVLT shown in FIG. 9. With TVLT however, full diversity may be regained, as predicted as illustrated above according to a particular embodiment.

As illustrated above according to particular embodiments, time-varying linear transformations may be applied to designing full diversity turbo space-time codes. TVLT may comprise a unitary transformation capable of converting constant modulations into time varying modulations, enabling satisfaction of the rank criterion. Unlike space-time and turbo space-time codes with fixed modulations, which may require exhaustive rank tests to ensure full diversity, the rank property may, but not necessarily, be inherent to TVLT codes in particular embodiments. Rules for the construction of TVLT have been provided for an arbitrary number of antennas and claimed subject matter is not limited to implementations with any particular number of antennas. A relation between full diversity and coding gain has been illustrated above according to a particular embodiment in which coding gain fails to meet a prescribed level with a probability that decreases exponentially with the minimum Hamming distance of the code. This theorem has two implications: (1) that the design criterion for turbo-STC is the Hamming distance between codewords (before TVLT application); (2) since turbo-STC typically display high minimum Hamming distance, they are good candidates for use with TVLT. A second theorem established the rates achievable with TVLT space-time codes. It was shown that limits due to constant modulation over the codeword duration do not apply to TVLT and that significantly higher rates are achievable.

Beyond affording full diversity gain, robust coding gains, and high rates, TVLT also enables convenient performance analysis and design using the EXIT method. Previously, the EXIT chart analysis has been developed for binary and multilevel codes, but it has been limited to SISO systems. As shown above, an EXIT chart may be generated for turbo codes with TVLT, where performance may be averaged over channels specified by the singular values of the channel matrix in particular embodiments. In a particular example for the two transmit antenna case, two eigenvalues may sufficiently specify the region of convergence of the turbo code. Additionally, as shown above, this region of convergence can be applied to evaluate the FER of the code.

Various turbo space-time codes with TVLT according to specific embodiments are demonstrated above by simulations and by FER analysis. Here, in particular embodiments, these codes display properties of full diversity, gain and rate as predicted by the analysis and overall performance with a gap of only 2 dB to outage capacity.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

What is claimed is:

1. A method comprising:
   space-time encoding information of one or more information streams according to a unitary time varying linear transformation (TVLT) to provide associated symbol streams; and
   transmitting said symbol streams over respective ones of a plurality of transmit antennas.

2. The method of claim 1, further comprising generating codeword symbols based, at least in part, on said one or more information streams.

3. The method of claim 2, wherein said space-time encoding further comprises applying complex-valued scalars to individual values in said codeword symbols to provide said symbol streams.

4. The method of claim 2, and further comprising storing a plurality of unitary matrices, and wherein said space-time encoding information of said plurality of information streams further comprises scaling individual values of said codeword symbols by elements of said unitary matrices.

5. The method of claim 4, wherein said stored unitary matrices are associated with time intervals, wherein said scaling said individual values of said codeword symbols by elements of said unitary matrices further comprises:
   scaling said individual values of said codeword symbols in a first symbol interval with elements of a first one of said unitary matrices associated with said first symbol interval; and
   scaling said individual values of said codeword symbols in a second symbol interval with elements of a second one of said unitary matrices associated with said second symbol interval.

6. The method of claim 4, wherein elements of said unitary matrices are based, at least in part, on pseudo randomly generated values.

7. The method of claim 2, wherein said generating codeword symbols comprises turbo encoding said information to provide codeword symbols.

8. The method of claim 7, wherein said turbo encoding said information further comprises generating encoded blocks, and wherein said symbol streams are based, at least in part, on said encoded blocks.

9. The method of claim 8, wherein one or more of said encoded blocks comprise:
   a first sub-block comprising payload information based, at least in part, on information from one or more of said information streams; a second sub-block comprising parity bits computed using convolutional encoding; and a third sub-block determined, at least in part, from a known permutation of said payload information.

10. An apparatus comprising:
    an encoder to space-time encode information of one or more information streams according to a unitary time varying linear transformation (TVLT) to provide symbol streams; and
    a transmitter to transmit said symbol streams over respective ones of a plurality of transmit antennas.

11. The apparatus of claim 10, wherein said encoder is further adapted to generate codeword symbols based, at least in part, on said one or more information streams.

12. The apparatus of claim 11, wherein said encoder is further adapted to apply complex-valued scalars to individual values in said codeword symbols to provide said symbol streams.

13. The apparatus of claim 11, and further comprising a memory to store a plurality of unitary matrices, and wherein said encoder is further adapted to scale individual values of said codeword symbols by elements of said unitary matrices.

14. The apparatus of claim 13, wherein said stored unitary matrices are associated with time intervals, wherein said encoder is further adapted to: scale said individual values of said codeword symbols in a first symbol interval with elements of a first one of said unitary matrices associated with said first symbol interval; and scale said individual values of said codeword symbols in a second symbol interval with elements of a second one of said unitary matrices associated with said second symbol interval.

15. The apparatus of claim 13, wherein elements of said unitary matrices are generated based, at least in part, on pseudo randomly generated values.

16. The apparatus of claim 10, wherein said encoder is further adapted to turbo encode said information to provide codeword symbols.

17. The apparatus of claim 16, wherein said encoder is further adapted to turbo encode said information into encoded blocks, and wherein said symbol streams are based, at least in part, on said encoded blocks.

18. The apparatus of claim 17, wherein one or more of said encoded blocks comprise: a first sub-block comprising payload information based, at least in part, on information from one or more of said information streams; a second sub-block comprising parity bits computed using convolutional encoding; and a third sub-block determined, at least in part, from a known permutation of said payload information.

19. An apparatus comprising:
    a receiver to receive symbol streams from respective ones of a plurality of receive antennas; and
    a decoder to space-time decode information from said received symbol streams according to a unitary time varying linear transformation to provide one or more information streams.

20. A method comprising:
    receiving symbol streams from respective ones of a plurality of receive antennas; and
    space-time decoding information from received symbol streams according to a unitary time varying linear transformation to provide one or more information streams.

21. An article comprising:
    a storage medium comprising machine-readable instructions stored thereon that, upon execution by a computing device, result in the implementation of operations including:
    space-time decoding information from symbol streams received from respective ones of a plurality of receive antennas, wherein the space-time decoding is to be performed according to a unitary time varying linear transformation, to provide one or more information streams.

22. An article comprising:
    a storage medium comprising machine-readable instructions stored thereon that, upon execution by a computing device, result in the implementation of operations including:
    space-time encoding information of one or more information streams according to a unitary time varying linear transformation (TVLT) to provide associated symbol streams for transmission over respective ones of a plurality of antennas.

* * * * *